United States Patent [19]

Staral et al.

[11] Patent Number: 5,976,698
[45] Date of Patent: Nov. 2, 1999

[54] PROCESS AND MATERIALS FOR IMAGEWISE PLACEMENT OF UNIFORM SPACERS IN FLAT PANEL DISPLAYS

[75] Inventors: John S. Staral, Woodbury; Claire A. Jalbert, Cottage Grove; William A. Tolbert; Martin B. Wolk, both of Woodbury; Allan R. Martens, Lake Elmo; Thomas A. Isberg, Apple Valley, all of Minn.

[73] Assignee: 3M Innovative Properties Company, St. Paul, Minn.

[21] Appl. No.: 08/936,239

[22] Filed: Sep. 24, 1997

Related U.S. Application Data

[62] Division of application No. 08/671,283, Jun. 27, 1996, Pat. No. 5,710,097.

[51] Int. Cl.⁶ .................................................. B41M 5/00
[52] U.S. Cl. .................. 428/411.1; 428/195; 428/207; 428/212; 428/323; 428/347; 428/349; 428/354; 428/913; 428/914; 430/200; 503/227
[58] Field of Search ................... 428/195, 207, 428/212, 323, 343, 346, 347, 349, 354, 411.1, 913, 914; 430/200; 503/227

[56] References Cited

U.S. PATENT DOCUMENTS

| | | | |
|---|---|---|---|
| 4,720,173 | 1/1988 | Okada et al. | 350/341 |
| 4,772,583 | 9/1988 | Sprecker et al. | 512/12 |
| 4,776,671 | 10/1988 | Sumi et al. | 350/311 |
| 4,833,124 | 5/1989 | Lum | 503/227 |
| 4,874,461 | 10/1989 | Sato et al. | 156/633 |
| 4,877,697 | 10/1989 | Vollmann et al. | 430/20 |
| 4,912,083 | 3/1990 | Chapman et al. | 503/227 |
| 4,940,640 | 7/1990 | MacDiarmid | 429/213 |
| 4,942,141 | 7/1990 | DeBoer et al. | 503/227 |
| 4,948,777 | 8/1990 | Evans et al. | 503/227 |
| 4,948,778 | 8/1990 | DeBoer | 503/227 |
| 4,950,639 | 8/1990 | DeBoer et al. | 503/227 |
| 4,952,552 | 8/1990 | Chapman et al. | 503/227 |
| 4,983,023 | 1/1991 | Nakagawa et al. | 350/344 |
| 4,983,429 | 1/1991 | Takayanagi et al. | 428/1 |
| 5,023,229 | 6/1991 | Evans et al. | 503/227 |
| 5,024,990 | 6/1991 | Chapman et al. | 503/227 |
| 5,089,372 | 2/1992 | Kirihata et al. | 430/167 |
| 5,156,938 | 10/1992 | Foley et al. | 430/200 |
| 5,171,650 | 12/1992 | Ellis et al. | 430/20 |
| 5,268,782 | 12/1993 | Wenz et al. | 359/81 |
| 5,278,023 | 1/1994 | Bills et al. | 430/201 |
| 5,286,604 | 2/1994 | Simmons, III | 430/286 |
| 5,340,699 | 8/1994 | Haley et al. | 430/302 |
| 5,351,617 | 10/1994 | Williams et al. | 101/467 |
| 5,360,694 | 11/1994 | Thien et al. | 430/200 |
| 5,389,288 | 2/1995 | Rindo et al. | 252/299.01 |
| 5,401,607 | 3/1995 | Takiff et al. | 430/253 |

FOREIGN PATENT DOCUMENTS

| | | |
|---|---|---|
| 0 321 923 A2 | 6/1989 | European Pat. Off. . |
| 0 568 993 A2 | 11/1993 | European Pat. Off. . |
| 0 163 297 | 12/1995 | European Pat. Off. . |
| 5203967 | 8/1993 | Japan . |
| 7-28068 | 1/1995 | Japan . |
| 7-152038 | 6/1995 | Japan . |
| 7325298 | 12/1995 | Japan . |
| WO 93/01517 | 9/1990 | WIPO . |
| WO 95/27680 | 10/1995 | WIPO . |

OTHER PUBLICATIONS

Harrison et al., "The Use of Thermal Dye Transfer Technology for the Fabrication of Color Filter Arrays", *Int. Congress Adv. Non–Impact Printing Technology,* vol. 93(9), pp. 382–4 (1993).

Bello, K.A. et al., "Near–infrared–absorbing Squaraine Dyes containing 2,3–Dihydroperimidine Terminal Groups", *J. Chem Soc., Chem–Commun.,* p. 452–4 (1993).

Matsuoka, M., "Absorption Spectra of Dyes for Diode Lasers", Bunshin Publishing co., Tokyo (1990).

Matsuoka, M., "Infrared Absorbing Materials", Plenum Press, N.Y. (1990).

Morozumi, S., "Materials & Assembling Process of LCDs", *Liquid Crystals–Applications and Uses,* vol. 1, Ch. 7, Birendra Bahadur, Ed., World Scientific Publishing Co. Pte. Ltd., p. 171–194 (1990).

*Primary Examiner*—Bruce H. Hess
*Attorney, Agent, or Firm*—William D. Miller; Robert J. Pechman

[57] ABSTRACT

Process and materials are described for selectively placing uniform spacers on a receptor. Spacer elements are placed on a receptor by selectively irradiating a thermal transfer donor sheet comprising a transferable spacer layer. The transferable spacer layer may include particles or fibers to form a composite. The particles may have a spacing dimension either greater than or less than the thickness of the transferable layer. When the spacing dimension of the particle is greater than the thickness of the transferable layer, then the spacing dimension of the particles control the spacing distance. The process and materials are useful in the manufacture of flat panel displays, particularly, liquid crystal display devices.

27 Claims, No Drawings

PROCESS AND MATERIALS FOR IMAGEWISE PLACEMENT OF UNIFORM SPACERS IN FLAT PANEL DISPLAYS

This is a division of Application Ser. No. 08/671,283 filed Jun. 27, 1996, now U.S. Pat. No. 5,710,097.

FIELD OF THE INVENTION

The present invention relates to a process and materials for placement of spacers onto a receptor which provide uniform spacing and structural support in flat panel displays. More particularly, this invention relates to the precise placement of spacers using a thermal transfer donor sheet and an imaging radiation source.

BACKGROUND OF THE ART

Control of the spacings and mechanical forces within the construction of a flat panel display (i.e., liquid crystal displays, electroluminescent displays, vacuum fluorescent displays, field emission displays, and plasma displays) is often critical to the performance of the corresponding device and depends upon the incorporation of physical spacers into the corresponding display. For example, in liquid crystal displays (LCDs), the polarization of the light exiting the display is controlled in part by the optical path length through the liquid crystal layer. In current display technology, the thickness of the liquid crystal layer is determined by spacers, which may be in the form of particles (i.e., spherical beads or fibers), columnar structures (i.e., posts or pillars), microribs, etc. Spacers have become increasingly important with the desire for light-weight large format displays. To achieve lighter weight display panels, transparent polymeric substrates are typically used since they are much lighter than glass. However, polymeric substrates are more flexible; thus, requiring a denser population of spacers to maintain a uniform thickness throughout the display panel. The most common and inexpensive method for controlling the thickness of the liquid crystal layer is to deposit a random arrangement of particles having a narrow size distribution over the entire surface of the substrate or alignment layer. This process has an obvious disadvantage in that there is no control over the placement of the particles resulting in a high percentage of the particles appearing in the display windows, thus decreasing the amount of light that may pass through the display. In many applications, the particles are not anchored to the substrate and may shift or migrate causing artifacts to appear in those areas in the display cell. The spray application presents an additional issue in the manufacturing process. The display is assembled in Class 10 to 100 cleanrooms to meet the optical quality requirements for the liquid crystal displays. Spraying particles onto a surface results in many of the particles becoming airborne, thus making it difficult to maintain Class 10 to 100 standards. The thinner the layer desired the smaller the particle required which leads to increased handling and application difficulties.

One attempt to overcome the deficiencies in liquid crystal displays as described above is disclosed in U.S. Pat. No. 4,720,173 and Japanese Patent applications, JP 7325298, JP 5203967, and JP 2223922 where a photoresist material is bonded to the substrate, imaged and developed to generate spacer entities. This method allows one to more precisely place the spacer on the substrate; however, the requirement of a developing step adds an additional step to the process. Liquid development also produces spent developer solutions which must be disposed of. Many of the developers contain solvents or have a high pH, thus requiring special handling for safety and/or special disposal to meet federal and state environmental regulations. It is also more difficult to maintain a uniform thickness of the spacers when a photoresist is used. For example, the developer may etch away more of the surface in one area than in another.

An alternative approach for controlling spacing in liquid crystal displays is described in U.S. Pat. No. 5,268,782; where, a microstructured substrate is used as both a substrate and a spacer integrated into one element. To minimize interferences in the window areas, the microstructured surface typically comprises a series of parallel ridges (microribs). Even though the percentage of spacers within the optical window is minimized, a stripping effect is visible in the display. Additionally, the deposition of the high viscosity liquid crystals is more arduous when microribs are used for spacers. For instance, it is harder to apply the high viscosity liquid crystals without entrapping air which creates an optical defect in the layer.

Clearly there is a need for a method and materials for accurate placement of structurally supporting spacers which are cost effective, reliable, and eliminate interference with the optical integrity of the display panel.

SUMMARY OF THE INVENTION

The present invention overcomes the deficiencies of the prior art by employing a method and materials for placement of structurally supporting spacers on a receptor using a thermal transfer donor sheet and imaging radiation to accurately place uniform spacers in designated locations outside the display windows.

The present invention provides a thermal transfer donor sheet comprising, (a) a support, (b) a transferable spacer layer, and (c) an optional adhesive layer. At least one of the receptor, support, transferable spacer layer and adhesive layer contains a radiation absorber which converts a portion of the imaging radiation to heat. The imaging radiation provides the means for selectively transferring the transferable spacer layer to a receptor to form spacer elements on the receptor.

An alternative thermal donor sheet construction is provided which comprises; (a) a support, (b) a light-to-heat conversion layer containing a first radiation absorber, (c) a transferable spacer layer, and (d) an optional adhesive layer. The thermal transfer donor sheet may optionally include a non-transferable interlayer interposed between the light-to-heat conversion layer and the transferable spacer layer. A second radiation absorber may be present in the receptor, support, non-transferable interlayer, transferable spacer layer or adhesive layer.

The transferable spacer layer may be either a non-composite organic material or a composite containing particles having spacing dimensions which are either smaller than or larger than the thickness of the transferable spacer layer. When the spacing dimensions of the particles are smaller than or equal to the thickness of the transferable spacer layer, then the thickness of the transferable layer controls the spacing distance between the receptor and an additional substrate attached to the spacer elements in forming a flat panel display device. When the spacing dimensions of the particles are greater than the thickness of the transferable spacer layer, then the spacing dimensions of the particles control the spacing distance within the flat panel display.

In another embodiment, a process is described for selectively placing spacer elements on a receptor for use in a flat panel display including the steps of: (1) providing the thermal transfer donor sheet described above, (2) placing in intimate contact the receptor with the transferable spacer layer of the thermal transfer donor sheet, (3) irradiating at least one of the thermal transfer donor sheet or the receptor in an imagewise pattern with imaging radiation such that the radiation absorber in either the receptor or thermal transfer donor sheet construction absorbs a portion of the imaging radiation and converts that radiation to heat, (4) transferring the transferable spacer layer in the irradiated areas to the receptor, and (5) removing the thermal transfer donor sheet to form spacer elements corresponding to the irradiated areas on the receptor.

In yet another embodiment, a process is described for use in constructing a liquid crystal display device wherein the above described process further includes the steps of (6) attaching the spacer elements to a substrate to form cavities between the substrate and the receptor, (7) filling the cavities with liquid crystal materials, and (8) sealing the periphery of the substrate to the receptor.

As used herein the phrase "in intimate contact" refers to sufficient contact between two surfaces such that the transfer of materials may be accomplished during the imaging process to provide sufficient transfer of material within the thermally addressed areas. In other words, no imperfections are present in the imaged areas which render the article non-functional.

"Spacers" or "spacer elements" refer to elements which provide a means of separating two parallel substrates (or supports) and may also provide structural support for one or both of the same two parallel substrates.

"Spacing dimension" refers to the spacing distance between two parallel substrates provided by the spacer elements. For those spacer elements based on a non-composite organic material or a composite material wherein the composite contains particles which are smaller than the thickness of the transferable spacer layer, the spacing dimension is equal to the thickness of the spacer layer. However, when the composite contains particles having spacing dimensions that are greater than the thickness of the transferable spacer layer, the spacing dimension is equal to the diameter or height of the particles as oriented perpendicular to the substrates. In other words, if the particles are spherical in shape, then the diameter of the sphere is the dimension measured. If the particles are cylindrical in shape (i.e., rods), then the diameter of the cylinder is used if the cylindrical particles are oriented such that the circular dimension is perpendicular to the substrate. However, when the cylindrical shaped particles are oriented such that the length of the cylindrical particles are perpendicular to the substrates (i.e., pillar between the substrates), then the height of the cylinder is used as the spacing dimension.

"Imaging radiation" refers to energy from a radiation source that can cause an image-wise transfer of a mass transfer layer from a thermal transfer donor sheet to a receptor (or substrate).

DETAILED DESCRIPTION OF THE INVENTION

The present invention relates to a process for placing spacer elements on a receptor (or substrate) for use in a flat panel display. The spacer elements are placed on the receptor by selectively irradiating a thermal transfer donor sheet comprising, in order: (a) a support, (b) an optional light-to-heat conversion layer, (c) an optional non-transferable interlayer, (d) a transferable spacer layer and (e) an optional adhesive layer. The process includes the following steps: (i) placing in intimate contact a receptor and the thermal transfer donor sheet described above, (ii) irradiating at least one of the thermal transfer donor sheet or the receptor (or a portion thereof, i.e., substrate, spacer layer, interlayer, light-to-heat conversion layer, and/or adhesive layer) with imaging radiation to provide sufficient heat in the irradiated areas to transfer the spacer layer to the receptor, and (iii) transferring the transferable spacer layer in the irradiated areas to the receptor.

The thermal transfer donor sheet of the present invention can be prepared by depositing layers (b), (c), (d) and/or (e) described above onto a support. The support may be constructed of any material known to be useful as a support for a thermal transfer donor sheet. The support may be either a rigid sheet material such as glass or a flexible film. The support may be smooth or rough, transparent, opaque, translucent, sheet-like or non-sheet-like. Suitable film supports include polyesters, especially polyethylene terephthalate (PET), polyethylene naphthalate (PEN), polysulfones, polystyrenes, polycarbonates, polyimides, polyamides, cellulose esters such as, cellulose acetate and cellulose butyrate, polyvinyl chlorides and derivatives thereof, and copolymers comprising one or more of the above materials. Typical thicknesses of the support are between about 1 to 200 microns.

The transferable spacer layer may include organic materials or alternatively a composite comprising organic materials having incorporated therein particles or fibers. Suitable materials include any number of known polymers, copolymers, oligomers and/or monomers. Suitable polymeric binders include materials such as thermoset, thermosettable, or thermoplastic polymers, including phenolic resins (i.e., novolak and resole resins), polyvinylacetates, polyvinylidene chlorides, polyacrylates, cellulose ethers and esters, nitrocelluloses, polycarbonates, polysulfones, polyesters, styrene/acrylonitrile polymers, polystyrenes, cellulose ethers and esters, polyacetals, (meth) acrylate polymers, polyvinylidene chloride, α-chloroacrylonitrile, maleic acid resins and copolymers, polyimides, poly(amic acids), and poly(amic esters) and mixtures thereof.

When the transferable spacer layer includes a thermosettable binder, the thermosettable binder may be crosslinked after transfer to the receptor. The binder may be crosslinked by any method which is appropriate for that particular thermosettable binder, for example, exposing the thermosettable binder to heat, irradiating with a suitable radiation source, or a chemical curative.

Particles or fibers may be added to the transferable spacer layer to form a composite. The addition of particles or fibers to the transferable spacer layer may be accomplished by using any known particle or fiber with a spacing dimension less than or equal to the spacing required in the particular display device of interest. The particles may have a spacing dimension smaller than the thickness of the transferable spacer layer or a spacing dimension larger than the thickness of the transferable spacer layer. When the particle size is smaller, the thickness of the transferable spacer layer controls the spacing within the display device. Whereas, when larger particles are used the spacing dimension of the particles used in the composite controls the spacing in the display device. Preferably at least 5% of the particles have a spacing dimension greater than the thickness of the spacer layer and more preferably at least 10%. Either approach may be used as a means for achieving uniform separation and support of the substrates within the display. Suitable particles include organic and/or inorganic materials (solid or hollow) having any suitable shape (i.e., spheres, rods, posts, triangles, and trapezoids) and size distribution consistent with maintaining the desired separation. Preferred particles include current LCD spacer spheres, rods, etc. comprised of glass or plastic such as those referenced in Japanese Kokai Patent Application No. HEI 7[1995]-28068; U.S. Pat. Nos. 4,874,461; 4,983,429; and 5,389,288. In LCD displays, it is preferred that the standard deviation for the size distribution of particles is + or −20% of the mean particle spacing dimension (i.e., mean diameter of a spherical or cylindrical shaped particle, or average height of a cylindrical shaped particle). More preferably, the standard deviation is + or −10% of the mean. Most preferably, the standard deviation is + or −5% of the mean. When a fiber is used, the dimensions are typically measured as the denier (or fineness) of the fiber. The length of the fiber is preferably less than the diameter of the transferred spacer element.

Dispersants, surfactants and other additives (i.e., antioxidants, light stabilizers, and coating aides) may be included to aide in the dispersion of the particles and/or fibers or impart other desirable properties to the transferable spacer layer as known to those skilled in the art.

The compressibility of the element bearing the forces in the display (e.g., the particles in the case where the spacer layer comprises particles with a particle spacing dimension greater than the thickness of the transferable spacer layer and the transferable spacer layer in cases where the spacer layer does not comprise particles with particle spacing dimensions greater than the thickness of the transferable spacer layer) should be sufficient to maintain a uniform spacing gap in the corresponding display.

The thermal transfer donor sheet may also include other ingredients known to be useful with mass transfer donor sheets, such as radiation (or light) absorbing materials that absorb the imaging radiation and converts that radiation energy into heat energy, thus facilitating transfer of the transferable spacer layer from the donor sheet to a receptor. The radiation absorbing material may be any material known in the art that absorbs a portion of the incident imaging radiation and converts that imaging radiation energy to heat energy. Suitable radiation absorbing materials include absorbing dyes (i.e., dyes that absorb light in the ultraviolet, infrared, or visible wavelengths), binders or other polymeric materials, organic or inorganic pigments that can be a black-body or non-black-body absorber, metals or metal films, or other suitable absorbing materials.

Examples of radiation absorbing materials that have been found to be particularly useful are infrared absorbing dyes. Descriptions of this class of dyes may be found in Matsuoka, M., *Infrared Absorbing Materials*, Plenum Press, New York, 1990, in Matsuoka, M., *Absorption Spectra of Dyes for Diode Lasers*, Bunshin Publishing Co., Tokyo, 1990, in U.S. Pat. Nos. 4,772,583; 4,833,124; 4,912,083; 4,942,141; 4,948,776; 4,948,777; 4,948,778; 4,950,639; 4,940,640; 4,952,552; 5,023,229; 5,024,990; 5,286,604; 5,340,699; 5,401,607 and in European Patent Nos. 321,923 and 568, 993. Additional dyes are described in Bello, K. A. et al., *J. Chem. Soc., Chem. Commun.*, 452 (1993) and U.S. Pat. No. 5,360,694. IR absorbers marketed by American Cyanamid or Glendale Protective Technologies under the designation IR-99, IR-126 and IR-165 may also be used, as disclosed in U.S. Pat. No. 5,156,938. In addition to conventional dyes, U.S. Pat. No. 5,351,617 describes the use of IR-absorbing conductive polymers as radiation absorbing materials.

Other examples of preferred radiation absorbing materials include organic and inorganic absorbing materials such as carbon black, metals, metal oxides, or metal sulfides. Representative metals include those metallic elements of Groups Ib, IIb, IIIa, IVa, IVb, Va, Vb, VIa, VIb and VIII of the Periodic Table, as well as alloys thereof, or alloys thereof with elements of Groups Ia, IIa, and IIIb, or mixtures thereof. Particularly preferred metals include Al, Bi, Sn, In or Zn, and alloys thereof or alloys thereof with elements of Groups Ia, IIa and IIIb of the Periodic Table, or compounds or mixtures thereof. Suitable compounds of these metals include metal oxides and sulfides of Al, Bi, Sn, In, Zn, Ti, Cr, Mo, W, Co, Ir, Ni, Pd, Pt, Cu, Ag, Au, Zr and Te, and mixtures thereof.

The radiation absorbing material may be present in the thermal transfer donor sheet as a separate layer, commonly referred to as a "light to heat conversion layer" (LTHC), interposed between the support and the transferable spacer layer. A typical light to heat conversion layer includes one or more layers of organic or inorganic materials that are capable of absorbing the imaging radiation and are preferably thermally stable. It is also desirable that the light to heat conversion layer remain substantially intact during the imaging process. When a metallic film is used for the light to heat conversion layer, the metallic layer preferably has a thickness between 0.001 to 10 $\mu$m, more preferably between 0.002 to 1.0 $\mu$m.

Alternatively, a light to heat conversion layer may consist of light absorbing particles (i.e., carbon black) dispersed in a binder. Suitable binders include film-forming polymers such as thermoset, thermosettable, or thermoplastic polymers, such as phenolic resins (i.e., novolak and resole resins), polyvinylacetates, polyvinylidene chlorides, polyacrylates, cellulose ethers and esters, nitrocelluloses, polycarbonates, and mixtures thereof. When this type of light to heat conversion layer is used, the dry coating thickness is preferably between 0.05 to 5.0 micrometers ($\mu$m), more preferably 0.1 to 2.0 $\mu$m.

When the LTHC layer is present, an optional non-transferable interlayer may be interposed between the transferable spacer layer and the LTHC layer. The incorporation of a interlayer reduces the level of contamination of the resulting transferred image from the light-to-heat conversion layer and decreases the amount of distortion in the transferred image. The interlayer may be either an organic or inorganic material. To minimize damage and contamination of the transferred spacer element, the interlayer is preferably a continuous coating which has a high thermal resistance and remains substantially intact and in contact with the LTHC layer during the imaging process. Suitable organic materials include both thermoset (crosslinked) and thermoplastic materials. The interlayer may be either transmissive or reflective at the imaging radiation wavelength output.

Suitable thermoset resins useful in the interlayer include both thermal- and radiation-crosslinked materials, such as crosslinked poly(meth)acrylates, polyesters, epoxies, and polyurethanes. For ease of application, the thermoset materials are usually coated onto the light-to-heat conversion layer as thermoplastic precursors and subsequently crosslinked to form the desired crosslinked interlayer. Classes of suitable thermoplastic materials include polysulfones, polyesters, and polyimides. The thermoplastic interlayer may be applied to the light-to-heat conversion layer using conventional coating techniques (i.e., solvent coating, spray coating, or extrusion coating). The optimum thickness of the interlayer is determined by the minimum thickness at which transfer of the light-to-heat conversion layer and distortion of the transferred spacer layer are eliminated, typically between 0.05 $\mu$m and 10 $\mu$m.

Suitable inorganic materials for use as interlayer materials include metals, metal oxides, metal sulfides, and inorganic carbon coatings, which are highly transmissive at the imaging radiation wavelength and may be applied to the light-to-heat-conversion layer using conventional techniques (i.e., vacuum sputtering, vacuum evaporation, or plasma jet). The optimum thickness is determined by the minimum thickness at which transfer of the light-to-heat conversion layer and distortion of the transferred layer are eliminated, typically between 0.01 μm and 10 μm.

The thermal transfer donor sheet may include an optional adhesive layer overcoated on the surface of the transferable spacer layer. The adhesive layer provides inproved transfer of the transferable spacer layer to a receptor by means of a thermally activated adhesive. The adhesive topcoat is preferably colorless; however, in some applications a translucent or opaque adhesive may be desirable to enhance the contrast of the display or to provide special effects. The adhesive layer is preferably non-tacky at room temperature. The adhesive layer may also include a light absorbing material to further assist the transfer efficiency of the image. Preferred adhesives include thermoplastic materials having melting temperatures between approximately 30° C. and 110° C. Suitable thermoplastic adhesives include materials such as polyamides, polyacrylates, polyesters, polyurethanes, polyolefins, polystyrenes, polyvinyl resins, copolymers and combination thereof. The adhesive may also include thermal or photochemical crosslinkers to provide thermal stability and solvent resistance to the transferred image. Crosslinkers include monomers, oligomers and polymers which may be crosslinked thermally or photochemically by either external initiator systems or internal self-initiating groups. Thermal crosslinkers include materials capable of crosslinking when subjected to thermal energy.

Alternatively, radiation absorbing materials may be incorporated into the receptor, or in a separate topcoat deposited on the surface of the receptor (i.e., a black matrix on the receptor, an adhesive topcoat deposited on the surface of the receptor) to assist in the transfer of the spacer layer to the receptor. If the radiation absorbing material is present in the receptor, or is in a portion of the thermal transfer donor sheet that is transferred to the receptor during imaging process, then it is preferred that the radiation absorbing material not interfere with the performance properties (i.e., the desired optical properties) of the imaged receptor.

The receptor may be any flat panel display element benefiting from the application of spacers. The spacers are precisely placed in the desired locations to avoid optical interference in the display windows of the display device. The receptor may be optionally coated with an adhesive topcoat to facilitate the transfer of the transferable spacer layer to the receptor. The receptor may also have deposited on the surface a black matrix to enhance viewing contrast. The black matrix may be formed by deposition of inorganic (i.e., metal and/or metal oxides, and metal sulfides) or organic materials (i.e., dyes in an organic binder) or a combination of both (i.e., carbon black dispersed in a binder). The black matrices generally have a thickness between 0.005 to 5 microns. Typically, the receptor has a thickness between 1 to 2000 microns.

In the practice of the present invention, the thermal imaging element is positioned such that upon application of the imaging radiation (or light), the LTHC layer absorbs the imaging radiation and converts it to heat in the irradiated areas which in turn promotes the transfer of the transferable spacer layer in the irradiated areas to form the spacer elements on the receptor.

The formation of the spacers may be effected by appropriate modulation of a imaging radiation source or by exposure through a mask. The spacers may be precisely placed in the desired locations to avoid optical interference in the display windows of the display device. A variety of light-emitting sources can be utilized in the present invention including flash lamps, high powered gas lasers, infrared, visible, and ultraviolet lasers. In an analog system, a mask is used to selectively filter the radiation in an imagewise pattern corresponding to the desired spacer locations. Flash lamps having sufficient energy output to transfer the spacer layer may be used in the analog systems. In a digitally addressed system, a laser or laser diode is typically used to imagewise transfer the spacer layer onto the substrate in the desired spacer locations. Preferred lasers for use in this invention include high power (>100 mW) single mode laser diodes, fiber-coupled laser diodes, and diode-pumped solid state lasers (i.e., Nd:YAG and Nd:YLF), and the most preferred lasers are diode-pumped solid state lasers. In both the analog and digitally addressed systems, the spacers may be precisely placed in the desired locations to avoid optical interference in the display windows of the display device. Since the spacers are selectively transferred from the thermal transfer element onto the substrate, no liquid process steps are necessary to develop the image. The direct imaging process eliminates the need for additional equipment, additional process steps to develop the image and disposal of spent developers.

During laser exposure it may be desirable to minimize formation of interference pattern due to multiple reflections from the imaged material. This can be accomplished by various methods. The most common method is to effectively roughen the surface of the thermally imageable element on the scale of the incident imaging radiation as described in U.S. Pat. No. 5,089,372. An alternate method is to employ the use of an anti-reflection coating on the second interface that the incident illumination encounters. The use of anti-reflection coatings is well known in the art, and may consist of quarter-wave thicknesses of a coating such as magnesium fluoride, as described in U.S. Pat. No. 5,171,650. Due to cost and manufacturing constraints, the surface roughening approach is preferred in many applications.

A representative application of the process for using the thermal transfer donor sheet described herein for selective placement of spacers on a substrate is in the manufacture of liquid crystal display devices. A twisted nematic display device is an example of a typical liquid crystal display, which comprises a cell or envelope formed by placing a pair of transparent, planar substrates, in register, overlying and spaced apart from one another using spacer elements. The periphery of the substrates are joined and sealed with an adhesive sealant usually applied by a screen printing technique to provide an enclosed cell. The shallow space or cavity between the spacer elements on the substrates is filled with liquid crystal materials just prior to final sealing. Conductive, transparent electrodes are arranged on the inside surface of the substrates in either a segmented or X-Y matrix design to form a plurality of picture elements. Alignment coatings are applied to portions of the interior surface of the liquid crystal display cell to cause a desired orientation of the liquid crystal material at its interface with the surface of the display. This ensures that the liquid crystal rotates light through angles which are complementary to the alignment of the polarizers associated with the cell. Polarizing elements are optional depending on the type of display and may be associated with one or more surfaces of the display when used. A reflector element may be associated with the bottom substrate when a reflective rather an a transmissive display is desired. In that event, the bottom substrate may not have to be transparent. The receptor may optionally contain an alignment layer coated on the surface, in which case, the spacers are applied to the alignment layer. The spacers are placed on the receptor (or alignment layer) using the process previously described by selectively irradiating the thermal transfer donor element in intimate contact with the receptor.

The components and assembly techniques of liquid crystal displays as described above are well known. For example, general details for assembly may be found in "Materials and Assembling Process of LCDs" *Liquid Crystals-Applications and Uses*, Bitendra Bahadur, Ed., World Scientific Publishing Co. Pte. Ltd., Volume 1, Chapter 7 (1990).

The following non-limiting examples further illustrate the present invention.

EXAMPLES

The materials employed below were obtained from Aldrich Chemical Co. (Milwaukee, Wis.) unless otherwise specified.

The following Examples illustrate the formation of spacers on a glass substrate using the following process. The spacers were formed on a glass substrate by placing the coated side of the thermal transfer donor element in intimate contact with the glass substrate in a recessed vacuum frame and then imaged using a single mode Nd:YAG laser in a flat field scanning configuration. The laser was incident upon the substrate side of the thermal transfer element and normal to the transfer element/glass receptor surface. Scanning was done with a linear galvonometer focused on to the image plane using an f-theta scan lens. The power on the image plane was 8 watts and the laser spot size (measured at the $1/e^2$ intensity) was 140×150 microns. The linear laser spot velocity was 4.6 meters/second measured at the image plane.

Example 1

A carbon black light-to-heat conversion layer was prepared by coating the following LTHC Coating Solution 1 onto a 0.1 mm (3.88 mil) PET substrate with a #9 coating rod.

LTHC Coating Solution 1:

| Component | Parts by Weight |
| --- | --- |
| Raven ™ 760 Ultra carbon black pigment (available from Columbian Chemicals, Atlanta, GA) | 3.78 |
| Butvar ™ B-98 (polyvinyl butyral resin, available from Monsanto, St. Louis, MO) | 0.67 |
| Joncryl ™ 67 (acrylic resin, available from S. C. Johnson & Son, Racine, WI) | 2.02 |
| Disperbyk ™ 161 (dispersing aid, available from Byk Chemie, Wallingford, CT) | 0.34 |
| FC-430 (fluorochemical surfactant, available from 3M, St. Paul, MN) | 0.01 |
| SR 454 (pentaerythritol tetraacrylate available from Sartomer, Exton, PA) | 22.74 |
| Duracure ™ 1173 (2-hydroxy-2 methyl-1-phenyl-1-propanone photoinitiator, available from Ciba-Geigy, Hawthorne, NY) | 1.48 |
| 1-Methoxy-2-propanol | 27.59 |
| Methyl ethyl ketone | 41.38 |

The coating was dried at 80° C. for 3 minutes and subsequently UV-cured on a Fusion UV Curing Model MC-6RQN fitted with 300 w/inch H-bulbs and utilizing a web transport speed of 22.9 m/min. (75 ft./min.) The cured coating had thickness of 3 microns and an optical density of 1.2 at 1064 nm.

Onto the carbon black coating of the light-to-heat conversion layer the Protective Interlayer Solution 1 was coated using a #4 coating rod.

Protective Interlayer Coating Solution 1:

| Component | Parts by Weight |
| --- | --- |
| Neorad ™ NR-440 (50% nonvolatiles in water, available from Zeneca Resins, Wilmington, MA) | 38.00 |
| Duracure ™ 1173 | 1.00 |
| Water | 61.00 |

The coating was dried at 80° C. for 3 minutes and subsequently UV-cured on a Fusion UV Curing Model MC-6RQN fitted with 300 w/inch H-bulbs and utilizing a web transport speed of 22.9 m/min. (75 ft/min.). The cured coating had thickness of 1 micron.

The interlayer was then overcoated with Transferable Spacer Layer Coating Solution 1 provided below:

Transferable Spacer Layer Coating Solution 1:

| Component | Parts by Weight |
| --- | --- |
| Elvacite ™ 2776 (acrylic resin, available from ICI Acrylics, St. Louis, MO) | 20.00 |
| N,N-dimethylethanolamine | 4.00 |
| Water | 76.00 |

Four separate coatings were made using #4, #6, #8 and #10 wire wound bars and all coatings were dried at 60° C. for 3 minutes. The thicknesses of the dried coatings on the four resultant samples ranged from 1 to 2 microns.

The thermal transfer elements were imaged onto 75 mm×50 mm×1 mm glass slides using the laser imaging system described above. The spacer layers were successfully transferred to the glass to give parallel lines approximately 95 microns wide. It was also demonstrated that the thickness of the transferred spacers can be increased by transferring additional spacer layers onto previously transferred spacers to create spacer lines with heights many times the height of the original transferred spacer lines. This was accomplished by repeating the imaging step with additional thermal transfer elements with the positions of the transferring lines registered to the positions of the previously transferred spacers.

Example 2

This example illustrates a thermal transfer element having a composite transferable spacer layer containing silica particles with particle spacing dimensions smaller than the thickness of the spacer transfer layer.

A carbon black light-to-heat conversion layer was prepared by coating the following LTHC Coating Solution 2 onto a 0.1 mm (3.88 mil) PET substrate with a Yasui Seiki Lab Coater, Model CAG-150 using a microgravure roll of 228.6 helical cells per lineal cm (90 helical cells per lineal inch).

LTHC Coating Solution 2:

| Component | Parts by Weight |
| --- | --- |
| Raven ™ 760 Carbon Black pigment | 3.78 |
| Butvar ™ B-98 | 0.67 |
| Joncryl ™ 67 | 2.02 |
| Disperbyk ™ 161 | 0.34 |
| FC-430 | 0.01 |
| SR 351 (trimethylolpropane triacrylate, available from Sartomer, Exton, PA) | 22.74 |
| Duracure ™ 1173 | 1.48 |
| 1-Methoxy-2-propanol | 27.59 |
| Methyl ethyl ketone | 41.38 |

The coating was in-line dried at 40° C. and UV-cured at 6.1 m/min. (20 ft./min.) using a Fusion Systems Model I600 (400 watts/inch) UV curing system fitted with H-bulbs. The dried coating had a thickness approximately 3.5 microns and an optical density of 1.2 at 1064 nm.

Onto the carbon black coating of the light-to-heat conversion layer was rotogravure coated Protective Interlayer Coating Solution 2 using the Yasui Seiki Lab Coater, Model CAG-150. This coating was in-line dried (40° C.) and UV-cured at 6.1 m/min. (20 ft/min.) using a Fusion Systems Model I600 (600 watts/inch) UV-curing system fitted with H-bulbs. The thickness of the resultant interlayer coating was approximately 1 μm. This LITI donor element was denoted as "LITI Donor Element I".

Protective Interlayer Coating Solution 2:

| Component | Parts by Weight |
| --- | --- |
| Butvar ™ B-98 | 0.99 |
| Joncryl ™ 67 | 2.97 |
| SR-351 | 15.84 |
| Daracure ™ 1173 | 0.99 |
| 1-Methoxy-2-propanol | 31.68 |
| 2-Butanone | 47.52 |

The protective interlayer of LITI Donor Element I was then overcoated with the following Transferable Spacer Layer Coating Solution 2 using a #10 wire wound bar and dried at 60° C. for 2 minutes. The thickness of the dried coating was determined by profilometry to be approximately 2.7 microns.

Transferable Spacer Layer Coating Solution 2:

| Component | Parts by Weight |
| --- | --- |
| Elvacite ™ 2776 | 9.62 |
| EMS-American Grilon Primid XL-552 (available from EMS-American Grilon, Sumter, SC) | 0.39 |
| Nalco Chemical 2327 (40 weight % $SiO_2$ in water, available from Nalco Chemicals, Chicago, IL) | 25.00 |
| N,N-dimethylethanolamine | 3.96 |
| Water | 76.04 |

The spacer layer (organic binder/$SiO_2$ coating) of the thermal transfer element was placed in intimate contact with a 75 mm×50 mm×1 mm glass slide receptor and imaged in an imagewise fashion using the procedure described above to transfer spacer lines approximately 60 microns wide and 2.7 microns thick with a center-to-center spacing of 400 microns. After imaging, the imaged glass receptor was heated to 250° C. in a nitrogen atmosphere for 1 hour to crosslink the spacer lines.

Example 3

This example illustrates a thermal transfer element having a composite transferable spacer layer containing particles having a spacing dimension greater than the thickness of the transferable spacer layer.

The protective interlayer of LITI Donor Element I in Example 2 was overcoated with Transferable Spacer Layer Coating Solution 3 using the same procedure as described in Example 2 for coating Transferable Spacer Layer Coating Solution 2.

Transferable Spacer Layer Coating Solution 3:

| Component | Parts by Weight |
| --- | --- |
| Elvacite ™ 2776 | 14.42 |
| EMS-American Grilon Primid XL-552 | 0.58 |
| $ZrO_2$ 4–8 micron diameter particles* | 5.00 |
| N,N-dimethylethanolamine | 4.00 |
| Water | 76.00 |

*As prepared in preparation A, Example 5 of U.S. Pat. No. 5,015,373

The spacer layer (organic binder/$ZrO_2$ coating) of the thermal transfer element was placed in intimate contact with a 75 mm×50 mm×1 mm glass slide receptor and imaged in an imagewise fashion using the procedure described above to transfer spacer lines approximately 105 microns wide and 3.0 microns thick with a center-to-center spacing of 300 microns. After imaging, the imaged glass receptor was heated to 250° C. in a nitrogen atmosphere for 1 hour to crosslink the spacer lines.

What is claimed:

1. A thermal transfer donor sheet for use in selectively placing spacers on a receptor in response to imaging radiation, the donor sheet comprising:
   a support;
   a transferable spacer layer; and
   a radiation absorber for converting the imaging radiation to heat energy to selectively transfer a portion of the transferable spacer layer.

2. The donor sheet of claim 1, further comprising a light-to-heat conversion layer disposed between the support and the transferable spacer layer, the radiation absorber being disposed within the light-to-heat conversion layer.

3. The donor sheet of claim 2, further comprising a second radiation absorber disposed in at least one of the support or the transferable spacer layer.

4. The donor sheet of claim 2, further comprising an interlayer disposed between the light-to-heat conversion layer and the transferable spacer layer.

5. The donor sheet of claim 4, further comprising a second radiation absorber disposed in at least one of the support, the transferable spacer layer, or the interlayer.

6. The donor sheet of claim 1, further comprising an adhesive layer disposed on the transferable spacer layer for enhancing adhesion to the receptor.

7. The donor sheet of claim 6, wherein the radiation absorber is disposed within the adhesive layer.

8. The donor sheet of claim 1, wherein the radiation absorber is disposed within the support.

9. The donor sheet of claim 1, wherein the radiation absorber is disposed in the transferable spacer layer.

10. The donor sheet of claim 1, the transferable spacer layer comprises an organic material.

11. The donor sheet of claims 1, wherein the transferable spacer layer comprises at least one polymeric or oligomeric material.

12. The donor sheet of claim 1, wherein the transferable spacer layer comprises at least one polymeric, oligomeric, or monomeric material that is polymerizable or crosslinkable after transfer to the receptor.

13. The donor sheet of claim 1, wherein the transferable spacer layer comprises particles or fibers.

14. The donor sheet of claim 13, wherein the transferable spacer layer further comprises a binder material in which the particles or fibers are disposed.

15. The donor sheet of claim 13, wherein the particles or fibers have spacing dimensions that are smaller than or equal to a thickness of the transferable spacer layer.

16. The donor sheet of claim 13, wherein at least a portion of the particles or fibers have a spacing dimension that is larger than a thickness of the transferable spacer layer.

17. The donor sheet of claim 13, wherein the particles or fibers are substantially spherical or cylindrical in shape.

18. A donor sheet comprising:

a support having a first surface;

a light-to-heat conversion layer disposed over the first surface of the support, the light-to-heat conversion layer comprising a radiation absorber that is capable of converting imaging radiation to heat; and a transferable spacer layer disposed over the light-to-heat conversion layer and responsive to heat from the radiation absorber to selectively transfer spacers to a receptor.

19. A donor sheet as recited in claim 18, further comprising an interlayer disposed between the light-to-heat conversion layer and the transferable spacer layer.

20. A donor sheet as recited in claim 19, further comprising a second radiation absorber disposed in the interlayer.

21. A donor sheet as recited in claim 18, further comprising a second radiation absorber disposed in at least one of the support or the transferable spacer layer.

22. A donor sheet as recited in claim 18, further comprising an adhesive layer disposed over the transferable spacer layer.

23. A donor sheet as recited in claim 18, wherein the transferable spacer layer comprises organic material.

24. A donor sheet as recited in claim 18, wherein the transferable spacer layer comprises particles or fibers.

25. A donor sheet as recited in claim 24, wherein the particles or fibers have spacing dimensions that are smaller than or equal to a thickness of the transferable spacer layer.

26. A donor sheet as recited in claim 24, wherein the particles or fibers have spacing dimensions that are larger than a thickness of the transferable spacer layer.

27. A donor sheet as recited in claim 18, wherein the transferable spacer layer comprises a polymerizable or crosslinkable material.

* * * * *